United States Patent [19]
Zirps

[11] 3,822,725
[45] July 9, 1974

[54] PULSATION DAMPING DEVICE FOR USE WITH PRESSURE FLUID OPERATED APPARATUS

[75] Inventor: Wilhelm Zirps, Hemmingen, Germany

[73] Assignee: Robert Bosch GmbH, Stuttgart, Germany

[22] Filed: Aug. 24, 1973

[21] Appl. No.: 391,288

[30] Foreign Application Priority Data
Oct. 4, 1972  Germany.......................... 363929[U]

[52] U.S. Cl. .................................................. 138/28
[51] Int. Cl. ............................................ F16l 55/04
[58] Field of Search .................... 138/28, 30; 73/392

[56] References Cited
UNITED STATES PATENTS
2,878,835  3/1959  Peterson .............................. 138/30
3,424,201  1/1969  Sigimara et al. ...................... 138/30

Primary Examiner—Jerry W. Myracle
Attorney, Agent, or Firm—Michael S. Striker

[57] ABSTRACT

An inner tube is concentrically surrounded by an outer tube with clearance. The inner tube is provided with apertures and in the clearance there is located a flexible tubular diaphragm which subdivides the clearance into an outer chamber containing a body of pressurized fluid, and an inner chamber including the interior of the inner tube, through which pressure fluid for the fluid-operated apparatus can pass. Arcuately curved valve plates of elastically yieldable material are mounted in the inner chamber and are normally out of contact with the exterior side of the inner tube. The diaphragm is flexible so that it can move to a position in which it contacts the outer side, in which case it deflects the valve plate into contact with this outer side so that they overly the apertures in the inner tube.

14 Claims, 8 Drawing Figures

3,822,725

PULSATION DAMPING DEVICE FOR USE WITH PRESSURE FLUID OPERATED APPARATUS

BACKGROUND OF THE INVENTION

The present invention relates generally to a device for operation with pressurized fluid, and more particularly for a pulsation-damping device for use with pressure-fluid apparatus.

Pressure-fluid operated apparatus, particularly hydraulic apparatus, is subject to pulsations when in operation, because of the intermittent manner in which many types of such apparatus utilize the pressure fluid supplied to them. This has various disadvantages well known to those skilled in the art, and heretofore it has been impossible to overcome these disadvantages in a manner which is feasible both from a point of economy and from a point of reliability in operation and in duration.

SUMMARY OF THE INVENTION

It is, accordingly, an object of the present invention to provide a pulsation-damping device for use with pressure-fluid operated apparatus, particularly hydraulic apparatus.

More particularly it is an object of the present invention to provide such a pulsation-damping device which is relatively simple in its construction and highly reliable in operation.

In keeping with these objects, and with others which will become apparent hereafter, one feature of the invention resides in a pulsation-damping device for use with pressure-fluid operated apparatus, comprising an inner tube provided with apertures and an outer tube surrounding the inner tube with clearance. A flexible tubular diaphragm is provided in this clearance and subdivides the same into an inner chamber for pressure fluid supplied to the apparatus, and an outer chamber surrounding the inner chamber and containing a body of pressurized fluid. Arcuately curved valve plates of elastically yieldable material are mounted in the inner chamber and normally out of contact with an outer side of the inner tube. The diaphragm is flexible to and from a position in which it contacts the outer side, and the valve plates are urged into contact with the outer side and close the apertures when the diaphragm is in its aforementioned position.

This device not only dampens the pulsations, but assures a reliable protection of the tubular diaphragm against the possibility of damage which might occur when the diaphragm is deflected rapidly and/or under very significant pressure against the inner tube so that it could contact the edges of the apertures provided therein. These edges might damage the diaphragm, a possibility which is avoided according to the present invention by the valve plates which are interposed between the apertures and the diaphragm and thus prevent the latter from becoming damaged.

Due to the fact that the valve plates are present in the construction according to the present invention, it is merely necessary to provide the inner tube with the apertures mentioned above, but no further operations are necessary, such as rounding the edges of the apertures or the like, because these edges cannot be contacted by the flexible diaphragm.

It is particularly advantageous if the inner tube is provided with at least two radial projections, preferably rib-shaped projections, which extend up to the inner diameter of the flexible diaphragm in unstressed condition thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
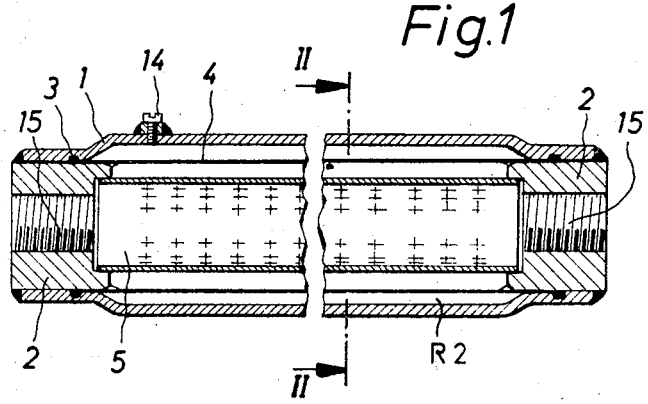
FIG. 1 is an axial section through a device according to the present invention, in one embodiment.
Figure 2:
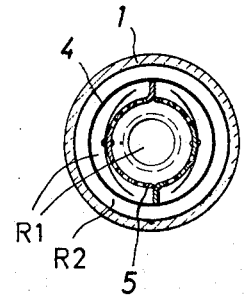
FIG. 2 is a section taken on line II—II of FIG. 1.
Figure 3:
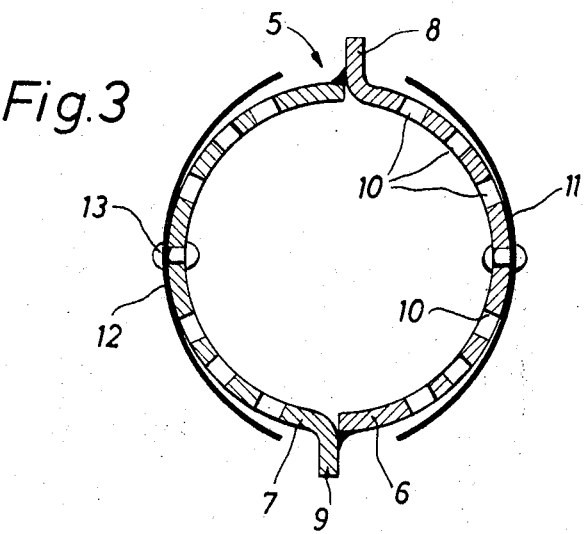
FIG. 3 is an enlarged section on line II—II of FIG. 1, with certain components omitted for the sake of clarity.

Discussing the drawing in detail, and referring firstly to the embodiment illustrated in FIGS. 1–3, it will be seen that the pulsation-damping device in this embodiment has an outer tube 1 the opposite ends of which are provided with connecting members or nipples 2 which are secured in appropriate manner, and in this embodiment being welded in place. The end portions of the tube 1 are of lesser diameter than the remainder of the tube 1, having an inner diameter which corresponds approximately to the outer diameter of the members 2 so that the latter are firmly seated. The inner sides of the end portions are each provided with an annular groove 3, and a flexible tubular diaphragm 4 is located within the outer tube 1, having end portions provided with bead-like parts which are each received in one of the grooves 3. The inner diameter of the flexible diaphragm 4 in the unstressed condition of the latter corresponds approximately to the outer diameter of the connecting members 2, as shown.

Located within the confines of the tubular diaphragm 4, concentric to the outer tube 1, is an inner tube 5 which is provided with a plurality of apertures 10 (shown in detail in FIG. 3, and identified by the crosses in FIG. 1). The opposite ends of the inner tube 5 are received in recesses of the members 2, so that the tube 5 is held in place by the members 2 as shown in FIG. 1. The tube 5 is of a rigid material, for instance, sheet steel or the like, and extends throughout the entire length of the operative portion of the pulsation-damping device. In the illustrated embodiment the tube 5 is composed, as clearly shown in FIG. 3, of two shell sections 6 and 7 which may be connected by a series of spot welds or the like and which are each provided with a flange 8 or 9, respectively, extending over its entire length. These flanges constitute radial projections of rib-like configuration, and the extent to which they project radially is so selected that when the tube 5 is in the assembled condition the projections 8 and 9 will just extend to the interior of the diaphragm 4.

Mounted on the exterior of the inner tube 5 are two arcuately configurated valve plates 11 and 12 which may be riveted to it and which cover the apertures 10 when the diaphragm 4 is deflected inwardly to a position in which it contacts the outer side of the inner tube 5. These arcuately configurated valve plates 11 and 12 are configurated as double-armed leaf springs which are riveted by means of rivets 13 at the portion which joins the two arms of each spring, as shown in FIG. 3.

It will be seen that in the construction of FIGS. 1-3 there exists an inner space or chamber R1 which is separated from an outer space or chamber R2 by the diaphragm 4. The outer or pressure chamber R2 is filled with a pressure medium, such as a gas, via the opening which is shown in FIG. 1 and which can be fluid-tightly closed by the screw 14. The opposite ends of the inner chamber R1 are connected to a pressure-fluid carrying conduit which supplies a fluid-operated apparatus. If, in operation, the pressure in the chamber R2 is higher at any time than the pressure in the chamber R1, then the flexible diaphragm 4 is deflected inwardly towards the inner tube 5, causing the valve plates 11 and 12 to be similarly deflected and to overly the apertures 10. They close these apertures 10 and prevent portions of the diaphragm 4 from being pressed into the apertures 10, and thus from being damaged by the edges bounding these apertures. If, on the other hand, the pressure of the fluid which passes axially through the inner chamber R1 becomes greater than the pressure in the chamber R2, then the valve plates 11, 12 are lifted off the apertures 10 so that pressure medium can flow from the interior of the tube 5 into the space between the latter and the diaphragm 4. Sudden pressure variation or continuous pressure pulsations are damped by compression and expansion of the gas in the chamber R2.

Figure 4:
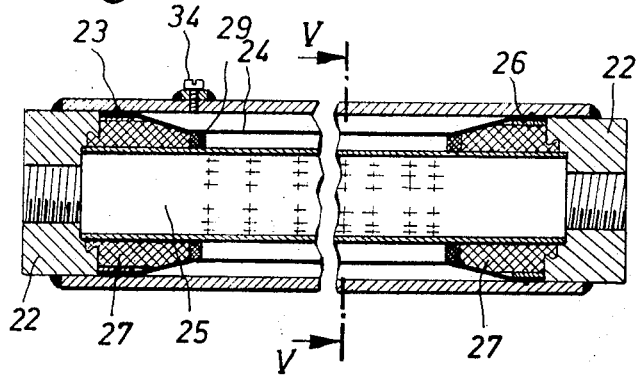
FIG. 4 is a view similar to FIG. 1, but illustrating a further embodiment of the invention.
Figure 5:
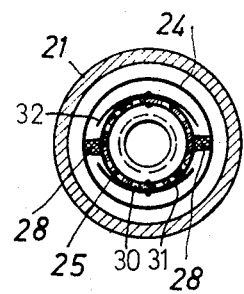
FIG. 5 is a section taken on line V—V of FIG. 4.

The embodiment in FIGS. 4 and 5 is analogous to that of FIGS. 1-3. In this second embodiment, however, the housing is again tubular and is identified with reference numeral 21. Unlike the embodiment of FIG. 1, the tubular housing 21 is of uniform diameter over its entire axial length. At its opposite ends it is provided with the connecting members 22 which are inserted into the opposite open ends and welded in place. Inner annular grooves 23 are again provided on the interior of the outer tube 21, and beads provided at the ends of the flexible diaphragm 24 are again inserted into the respective grooves 23, wherein they are retained by a pair of steel rings 26 which are inserted into the interior of the diaphragm 24 and are radially enlarged thereafter. The two ends of the diaphragm 24 are each supported by a fill ring 27 which advantageously is of synthetic plastic material and whose outer diameter increases in the direction towards the outer ends of the diaphragm 24 to a dimension which is greater than the inner diameter of the diaphragm 24 in the unstressed condition of the latter. Each of the rings 27 engages with its inner circumferential surface the inner tube 25 which in this embodiment is of cylindrical configuration and is again retained in recesses provided in the connecting members 22. At the end faces of the rings 27 which face away from one another, the rings are connected with the respectively adjacent connecting member 22.

The inner tube 25 is again apertures, as shown, and is provided with a pair of radial rib-like projections which extend to the inner surface of the diaphragm 25 in the unstressed condition of the latter. In this embodiment, however, the projections are in form of synthetic plastic strips 28 which are retained by rings 29 slipped onto the tube 25. The apertures in the tube 25 are designated with reference numeral 30 (see FIG. 5) and arcuate valve plates 31 and 32 are again provided as in the preceding embodiment, for closing the apertures 30. An opening is provided in the outer tube 21 and can be closed with a screw 34 so as to become fluid tight. The purpose of this opening is again to permit introduction of gas into the outer chamber R2.

The operation of this embodiment corresponds in all details to the operation of the embodiment in FIGS. 1—3 and need therefore not be particularly described.

Figure 6:
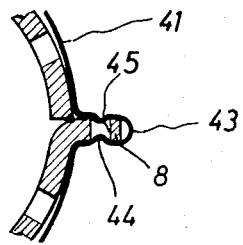
FIG. 6 is an enlarged fragmentary section illustrating a detail of a further embodiment of the invention.

FIG. 6 shows a fragment of a further embodiment, illustrating that the valve plates can be secured in a manner other than by means of the rivets 13. In FIG. 6 only one valve plate 41 is shown fragmentarily, having again the two arms but having here at the juncture of the two arms a blanket portion 43 configurated or are to be of substantial U-shape so that it can be clampingly slipped onto the respective projections 8,9 of the inner tube. Depressions 44 are formed in the portion 43, so as to provide inwardly extending projections which can snap into corresponding recesses 45 formed in the respective ribs of projections of the inner tube, here the rib 8.

Of course, the depressions and recesses could be reversed.

Figure 7:
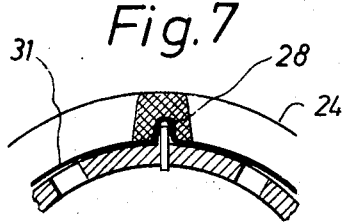
FIG. 7 is a view similar to FIG. 6, illustrating a detail of still another embodiment of the invention.

The embodiment of FIG. 7 shows that at the juncture of the two arms of the respective valve plate (here the valve plate 31) a U-shaped recess may be formed and that a depression may be provided in the strip-shaped synthetic plastic projection 28 so that the latter can straddle the projection which is formed due to the provision of the U-shaped recess in the portion connecting the two arms of the respective valve plate.

Figure 8:
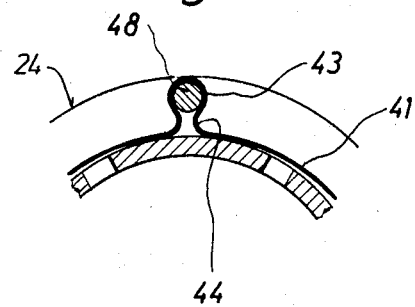
FIG. 8 is a view similar to FIG. 7, illustrating yet an additional embodiment of the invention.

The embodiment of FIG. 8, finally, shows a valve plate 41 having a portion connecting the two arms of the valve plate and shaped to the configuration shown in FIG. 8, this portion being identified with reference numeral 43. A rod 48, which may be mounted in rings corresponding to the rings 29 of the embodiment of FIGS. 4 and 5, is provided which is clampingly embraced by the portion 43 as shown in FIG. 8.

Any of the embodiments of FIGS. 6, 7 and 8 may be used in the construction of FIGS. 1-3 and 4-5, respectively. The operation will of course in all cases be identical with that described with reference to FIGS. 1-3.

It will be understood that each of he elements described above, or two or more together, may also find a useful application in other types of constructions, differing from the types described above.

While the invention has been illustrated and described as embodied in a pulsation-damping device for use with pressure-fluid operated apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A pulsation-damping device for use with pressure-fluid operated apparatus, comprising an inner tube provided with apertures; an outer tube surrounding said inner tube with clearance; a flexible tubular diaphragm in said clearance, subdividing the same into an inner chamber for pressure fluid supplied to said apparatus, and an outer chamber surrounding said inner chamber and containing a body of pressurized fluid; and arcuately curved valve plates of elastically yieldable material mounted in said inner chamber and normally out of contact with an outer side of said inner tube, said diaphragm being flexible to and from a position in which it contacts said outer side, and said valve plates being urged into contact with said outer side and closing said apertures when said diaphragm is in said position thereof.

2. A device as defined in claim 1, wherein said outer tube has opposite ends each provided with a connecting member which maintains said tubes concentric with one another and permits connection of said device to a fluid conduit; said outer tube having inner circumferential grooves in the region of its opposite ends, and said diaphragm having spaced ends provided with portions which extend into said grooves.

3. A device as defined in claim 2, wherein said connecting members include sections which engage said portions and retain them in said grooves.

4. A device as defined in claim 2; and further comprising steel rings accommodated in said outer tuge and engaging said portions for retaining the same in said grooves.

5. A device as defined in claim 2; and further comprising ring members received in said outer tube and engaging the respective ends of said diaphragm, urging said portions into said grooves.

6. A device as defined in claim 5, wherein said ring members are of synthetic plastic material.

7. A device as defined in claim 5, wherein said ring members surround and engage said inner tube in the region of the respective ends thereof, and have respective axial endfaces connected with an adjacent one of said connecting members.

8. A device as defined in claim 1, said inner tube having at least two radial projections extending to an inner circumferential surface of said diaphragm when the latter is not in said position thereof.

9. A device as defined in claim 8, wherein said projections are rib-shaped projections.

10. A device as defined in claim 9, wherein said inner tube is composed of two rigidly connected shell sections, each shell section having a longitudinally extending flange which constitutes said rib-shaped projections.

11. A device as defined in claim 9, wherein said rib-shaped projections are strips of synthetic plastic material.

12. A device as defined in claim 1, wherein said valve plates are double-armed springs having a common portion which connects said arms and is fixedly connected to said inner tube.

13. A device as defined in claim 12; further comprising a plurality of U-shaped brackets, each engaging one of said common portions and being connected to said inner tube.

14. A device as defined in claim 13, wherein each bracket is provided with connecting portions which engage corresponding mating portions on said inner tube.

* * * * *